March 9, 1971 — T. J. STOLKI — 3,568,254
APPARATUS FOR DEEP DRAW MOLDING
Filed Sept. 19, 1968 — 2 Sheets-Sheet 1
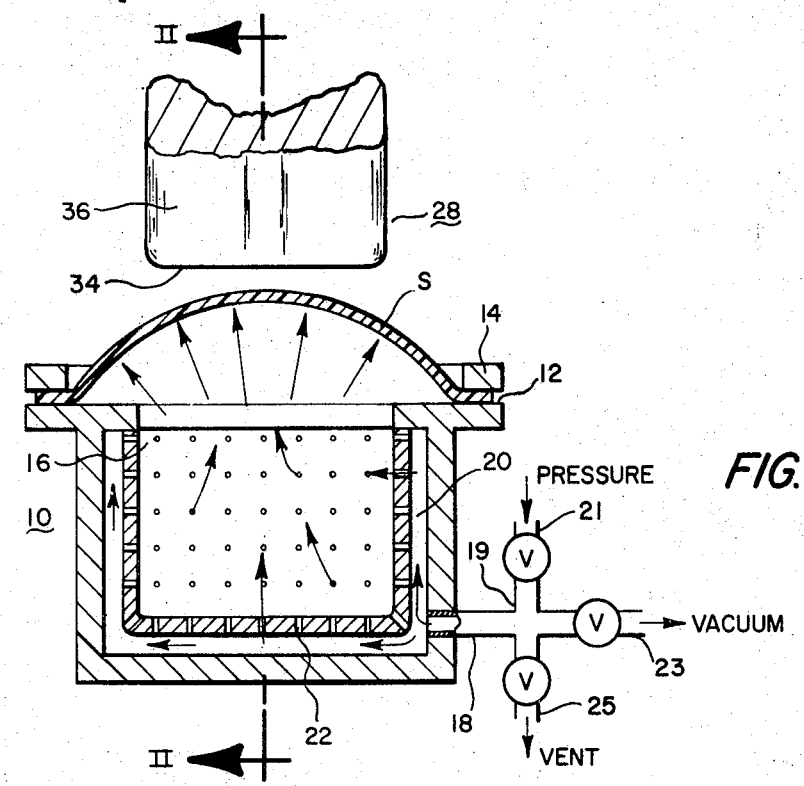
FIG. I
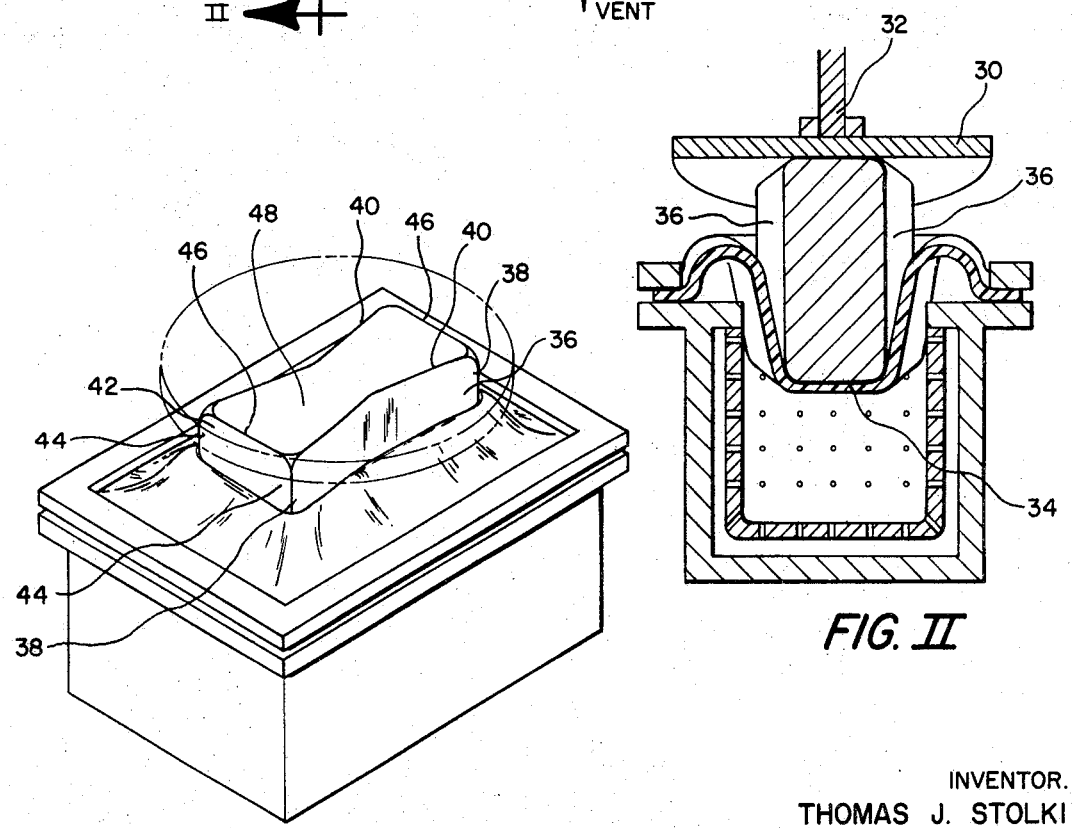
FIG. II
FIG. III
INVENTOR.
THOMAS J. STOLKI
BY Michael J. Murphy
ATTORNEY March 9, 1971   T. J. STOLKI   3,568,254
APPARATUS FOR DEEP DRAW MOLDING
Filed Sept. 19, 1968   2 Sheets-Sheet 2
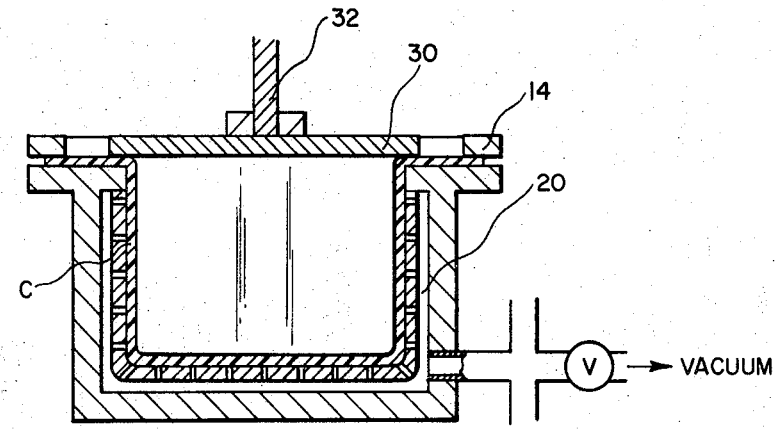
FIG. IV
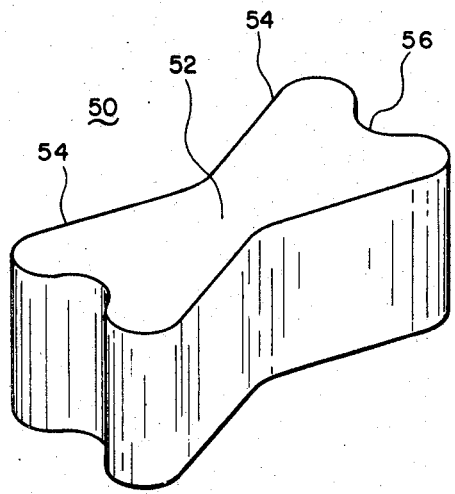
FIG. V
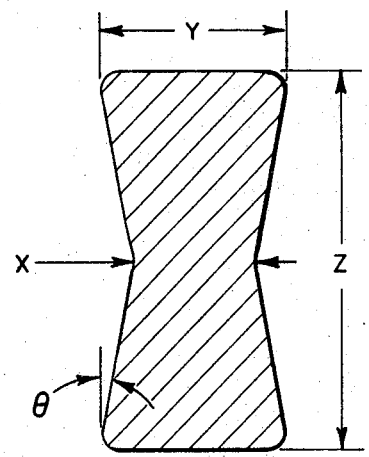
FIG. VI
INVENTOR.
THOMAS J. STOLKI
BY
Michael J. Murphy
ATTORNEY

United States Patent Office 3,568,254
Patented Mar. 9, 1971

3,568,254
APPARATUS FOR DEEP DRAW MOLDING
Thomas J. Stolki, Wilbraham, Mass., assignor to
Monsanto Company, St. Louis, Mo.
Filed Sept. 19, 1968, Ser. No. 760,757
Int. Cl. B29c 17/03, 17/04
U.S. Cl. 18—19
7 Claims

ABSTRACT OF THE DISCLOSURE

A specially contoured thermoforming plug having two sides with depressions formed therein in order to provide improved distribution of material in deep draw molded articles.

---

The present invention relates to an apparatus for forming hollow articles and more particularly to an apparatus for producing relatively deep, thin wall thermoplastic containers.

Plug assist thermoforming of containers is well-known in the art. It involves clamping a heated sheet of thermoplastic material over the open mouth of a mold cavity which conforms to the shape of the container, mechanically drawing a portion of the heated sheet into the cavity by means of an advancing plug to partially form the container, and then pneumatically moving the partially formed container off the plug against the cavity walls to finish form the container. In forming deep containers, when the sheet is in place over the mouth of the cavity and before plug contact, it is usually prestretched away from the cavity either as a result of the weight of the sheet itself when the cavity faces downwardly, or by means of a positive gas pressure acting against the sheet when the cavity is facing upwardly. The purpose of this prestretching is to avoid the costly approach of utilizing an excessively thick sheet to provide adequate material to form the deep container, and to avoid premature contact or chilling of the hot sheet by the mold surfaces. When the container to be formed is non-circular, e.g., rectangular, it has been found that the sheet stretches non-uniformly at this stage of the process, i.e., more in the center area of the wide axis of the rectangularly shaped clamped sheet portion, than in the remaining areas of the sheet. This uneven reduction in sheet thickness eventually appears in the walls of the finished article and results in a structurally weak container.

In addition, the portion of the sheet which initially contacts the plug surface has a tendency to become trapped and to remain there against the plug face throughout the forming operation, thereby resulting in a container having a bottom which is thicker than that of the sides. This effect is, of course, a function of the temperature and surface characteristics of the plug face, but these parameters are often difficult to control, especially with relatively small plug cross sections.

Adherence of the sheet to the plug surface also occurs along the sides of the plug as it penetrates deeper into the cavity, thereby producing localized thickness variations and drag marks in the finished container. Also, since the die is usually maintained cool to rapidly set the plastic after final forming, it is necessary to keep the sheet portion adjacent the clamp away from the mouth of the cavity for as long as possible during the drawing stage of the process. To achieve these latter effects, a positive pressure is usually maintained in the cavity during plug entry to billow and stretch the sheet upwardly in the opposite direction from plug movement and to keep the sheet out of contact with the plug and cavity surfaces for as long as possible before final expansion of the sheet against the cavity walls. However, after the plug has proceeded beyond the cavity mouth, the space between it and the clamp holding the sheet in place is determinative of the area available for maintaining the billowing sheet, and this is often insufficient for sustaining the billow up through the time the plug bottoms in the cavity.

Prior attempts to overcome early elimination of the billow involved reducing the plug cross section for a given die size, in order to provide increased clearance between the plug and cavity walls, but this did not solve the problem and can create additional problems since if the plug size is excessively reduced, thinning in other areas of the container will occur as a result of insufficient material to form the container being drawn into the mold by the advancing plug.

Now there has been developed a unique thermoforming plug which effectively overcomes all of these past difficulties and permits deep draw thermoforming of containers having improved distribution of plastic material therein.

Accordingly, it is an object of this invention to overcome the prior art difficulties in forming thin walled containers, especially those having deep drawn thermoformed portion wherein the surface area of the finished container is substantially greater than that of the area of the starting sheet material.

It is an additional object of this invention to provide a deep draw molding apparatus for obtaining improved uniformity of distribution of material in the finished container.

It is an additional object of this invention to provide an improved thermoforming plug configuration.

It is another object of this invention to minimize contact of a thermoplastic sheet portion with the surfaces of a mechanical deforming plug or die until the plug has almost completely entered the die in a deep draw thermoforming operation, in order to improve material distribution in an upper body section of the container.

It is a further object of this invention to provide an apparatus of the aforenoted type which can produce both shallow and deep drawn containers having improved uniformity of wall thickness, at high production capacities without increasing the unit cost per container.

Other objects of this invention will in part be obvious and will in part appear hereinafter.

These and other objects are accomplished by providing an apparatus for forming a relatively deep, thin walled container from a sheet of thermoplastic material comprising a mold including a cavity having a periphery generally conforming to the shape of the container, a contoured plug disposed opposite to the mold, having a plurality of sides with two of the sides having depressions formed therein, means for actuating the plug to draw a predetermined area of the plastic sheet into the cavity of the mold to provide a partially formed container and means for expanding the partially formed container against the wall of the cavity of the mold.

In describing the overall invention, reference will be made to preferred embodiments illustrated in the accompanying drawings in which:

FIG. I is a semi-diagrammatical sectional view of apparatus embodying the present invention at an early stage in the thermoforming process;

FIG. II is a view taken along the line II—II of FIG. I after the plug has engaged the sheet;

FIG. III is a perspective view illustrating the position of the sheet with respect to the advancing plug in the stage of the process depicted in FIG. II;

FIG. IV is a view similar to FIGS. I and II illustrating the final step in forming the container;

FIG. V is a perspective view of an alternate form of the plug of the present invention; and FIG. VI is a sectional view of the plug of FIGS. I–IV.

With reference to the drawings wherein identical numerals refer to identical parts, there is illustrated an apparatus and method for forming a relatively deep, thin walled container from a sheet of thermoplastic material. In the embodiment shown in FIGS. I–IV, the container is to be a generally rectangular box being about 20½ inches wide, 37 inches long and 20½ inches deep. The thermoplastic which is in the form of a sheet S having an initial thickness of about 230 mils, is clamped against the top surface 12 of mold 10 by means of clamping plate 14 having a central opening in which the sheet is exposed. The central opening generally conforms in shape to that of the cross section of the mold cavity which in the present preferred embodiment is rectangular. Sheet S has been previously brought into association with suitable conventional heating means (not shown) such as electrical resistance heaters, in a manner well-known to those skilled in the art, in order to heat the sheet to a temperature appropriate to the particular plastic and place it in a deformable state.

Mold 10 has a rectangularly shaped cavity 16 therein having peripheral dimensions which generally conform to the shape of the container being formed. In accordance with the method depicted, the pressure in cavity 16 may be increased or decreased by means of conduit 18 communicating with an intermediate fluid space 20, which in turn communicates with cavity 16 by means of small passages 22 which are appropriately spaced to perform an expansion of the plastic material when suction is applied in space 20 during a later step of the process. Conduit 18 is connected to manifold 19 having three branches therein, i.e., 21 which is connected to a source of pressurized fluid (not shown), 23 which is connected to a vacuum source (not shown) and 25 which is open to the atmosphere. Suitable valves V are located in each of the three branches 21, 23 and 25 so as to provide for varying the pressure in space 20 from the upstream level at the ends of branches 21, 23 and 25.

As an essential element of the present invention, contoured plug 28 is provided, and is initially disposed opposite mold 10 and mounted on vertically reciprocable platen 30, which in turn is connected by means of shaft 32 to a suitable actuating mechanism (not shown). Punch 28 is elongated in cross section, and in the embodiment shown has a plurality of sides, being generally rectangular in configuration, except that it has somewhat the general shape of an hour glass or dogbone depending on the direction from which it is viewed, and which is achieved by means of depressions formed in two oppositely disposed sides. In further detail, plug 28 is solid in cross section but could be hollow and comprises a bottom wall 34, a pair of oppositely disposed elongated sides 36. Each side 36 has (FIG. III) two longitudinally extending edges 38 and two laterally extending edges 40. Plug 28 further comprises a pair of integral, oppositely disposed short sides 42 extending between elongated sides 36 and connected thereto along the longitudinally extending edges 38 of sides 36. Oppositely disposed short sides 42 similarly have two longitudinally extending edges 44 and two laterally extending edges 46. The two pairs of oppositely disposed elongated and short sides 36 and 42 extend upwardly from the periphery of bottom wall 34. Plug 28 further comprises top wall 48 extending around the upper extremities of the pairs of oppositely disposed elongated and short sides. As depicted in FIG. III, each of the oppositely disposed elongated sides taper slightly inwardly from each of their two longitudinally extending edges 38 toward the center lines of these sides.

Plug 28 is heated in a well-known manner to a desired temperature, for example, by means of electrical heating elements incorporated therein. The heating elements may be thermostatically controlled to provide a plug surface temperature for example, of between about 250–300° F. The plug may be constructed of any solid material, e.g., metal, wood or plastic. In the present embodiment aluminum is employed.

In operating the apparatus of the present invention, after heated sheet S has been clamped across the open end of cavity 16 in mold 10, a positive pressure is introduced through conduit 18, intermediate space 20 and passages 22 into cavity 16, so as to billow sheet S upwardly as depicted in FIG. I and thereby stretch the material and thin it accordingly. It should be noted that the orientation of the apparatus may be reversed, i.e., the plug situated below the mold and the cavity facing downwardly, whereupon the weight of the sheet may be adequate to prestretch it without the requirement of fluid introduction into the cavity. Though the system in FIG. I is depicted as utilizing a hermetically sealed mold cavity, it should be understood that the mold may be continuously vented, i.e., the fluid being introduced to the cavity may be allowed to escape between the top surface 12 of the mold and the underside of sheet S. This initial stretching of the material takes place freely over the entire area within the clamped portion of the sheet without chilling by contact with the mold. However, as previously mentioned, the portions of the clamped sheet in the area of the center of the elongated sides stretches and thins to a greater degree than that of the remainder of the sheet, and consequently, the sheet thickness after this stretching is non-uniform throughout the clamped area.

After the sheet has been prestretched by billowing the clamped portion upwardly over the mouth of the mold, heated plug 28 is caused to descend into the ballooned plastic bubble by vertically reciprocating platen 30 to which the plug is attached. It will be understood that the reverse is also satisfactory, i.e., upward plug movement into a downwardly facing plastic bubble.

When the plug initially contacts the ballooned sheet the extent of contact is reduced over that which would be obtained if the plug were truly rectangular, due to the inwardly tapering elongated plug sides. The amount of plastic trapped on the front face of the plug is therefore reduced, and consequently, additional plastic in the center of the sheet is available (to the extent of the reduction of contact with the plug) to move outwardly and upwardly into the portion of the sheet which has been previously thinned and which will form the upper sidewall portion of the container body.

As the plug moves into the mold cavity the pressure will increase because of the reduction in volume therein, and to avoid rupturing the bubble, valve V on line 25 of manifold 19 which opens to the atmosphere may be partially opened to bleed off air and maintain the pressure within the cavity at the desired level. As seen in FIGS. II and III, the inwardly tapered elongated sides 36 of plug 28 also aid in maintaining the plastic material out of substantial contact with the major portion of the elongated sides of punch 28, except for the contact which must occur along the longitudinally extending edges thereof in order to draw the plastic into the mold cavity. As plug 28 proceeds into cavity 16 and further mechanically deforms ballooning sheet S to partially form the container, hot plastic is displaced upwardly from adjacent the area of reduced plug cross section to offset the thinning which has previously occurred. The positive pressure within the cavity provides a cushion to maintain the material in a ballooned condition, thus keeping the sheet portions away from the surface of the mold cavity, and especially away from the peripheral edge of the mouth of the cavity as the plug continues to advance to its position of maximum descent as shown in FIG. IV Stretch is thus imparted to the material and due to its freedom from engagement with the mold and punch surfaces and displacement in the area around the center of the tapered sides of the plug, an improved uniformity of thickness of plastic in the formed container results. Because of the added clearance provided between the plug surface and the cavity wall by the inwardly tapering sides of the punch, the secondary billow which is that maintained during plug descent, may be retained essentially until the punch reaches its point of maximum descent and bottoms out in the mold cavity.

As soon as punch 28 has reached its maximum descent, the valve on the cavity vent line to atmosphere is closed, and simultaneously a vacuum is drawn on the mold cavity by opening the valve on conduit 23 which connects with the vacuum source. The hot plastic material immediately snaps to the shape of the cavity resulting in a finish formed container C. The plastic loses its heat rapidly since the mold is relatively cool, the mold temperature being in the order of about 120–150° F. Also, simultaneously with the starting of the vacuum, the punch starts its ascent and moves to its starting position spaced opposite the die mouth.

Rapid removal of the formed part is preferably accomplished, following closing of the vacuum valve, by opening the air pressure valve in conduit 21 to introduce pressurized fluid into the mold cavity around the periphery of the formed article, while at the same time lifting the clamping member 14 to a point where the article can be completely removed from the mold. This fluid "blow off" following the vacuum forming operation also helps to remove any residual heat from the mold, to thus insure maintenance of a fast operating cycle and consequently high production rates with no lost time waiting for the mold to cool.

In FIG. V is shown an alternate form of the unique plug of the present invention. Plug 50 of this embodiment is elongated as was that of the previous embodiment, having a portion of reduced cross sectional area 52 in the center thereof caused by inwardly extending side portions 54, but also including centrally oriented depressed portions 56 formed in the oppositely disposed short sides thereof.

The above description and particularly the drawings are set forth for purposes of illustration only and are not to be taken in a limited sense.

The plug configuration of the present invention is uniquely effective in plug assist thermoforming of both large volume containers such as refrigerator cabinets as well as small volume containers such as cigarette packages, wherein the thermoplastic sheet must be drawn a rather substantial distance into the mold cavity. These relatively deep articles include those wherein the total overall length measured in a direction parallel to the axis of the body of the article is in excess of about 10 inches for sheet thicknesses in the range of between about 100 to 250 mils. Described another way, the depth of the mold cavity in deep draw molding ranges from between about 0.5 to 5 times that of the dimension of the shortest side of the mouth of the cavity. With such containers, substantial stretching of the sheet is necessary if an economical article is to be manufactured without requiring an abnormal increase in the thickness of the thermoplastic sheet. During drawing, the heated sheet tends to become trapped on whatever surface of the forming equipment with which it comes into contact and thereafter can no longer be effectively thinned by stretching. This is especially true of the front face of the plug, since contact therewith generally eliminates any possibility of the material thereafter moving into the side(s) of the container being formed. The plug of the present invention provides for a reduced amount of initial surface contact with the sheet to the extent of the inward slope of the plug sides, consistent with plug dimensions adequate to avoid excessive thinning and fracture of the sheet during the final expansion step. The reduced cross sectional configuration which extends along the entire length of the plug also permits maintenance of the sheet billow, and therefore, the resulting stretching action which ti provides until the plug proceeds almost the entire distance into the cavity.

Any plug having a plurality of sides with at least two of the sides having depressions formed therein is broadly within the scope of the present invention. Acceptable shapes may be defined as any cross section which is less than that of an imaginary sleeve placed around and in contact with the outermost extremities of the plug. This means that a triangular, square or oval cross section etc. (i.e., non-cylindrical shapes) having centrally oriented depressions formed in two sides thereof and preferably oppositely disposed sides may be satisfactorily used according to the invention. The invention is particularly applicable to generally rectangular shapes with rounded edges and corners, wherein stretching because of lack of symmetry is unusually non-uniform. Preferable limits of this configuration are depicted in the cross sectional view of FIG. VI, wherein Y represents the length of the short side and Z represents the length of the elongated side of the plug cross section $\theta$ represents the angle of taper which the portion of elongated side adjoining short side Y makes with the vertical and is defined by the relationship tan $$\theta = (0.25 - 2)\frac{Y}{Z}$$

The reduced cross section in the center area of the plug having a dimension defined by X in FIG. VI may range between 0.5 ot 0.9 times Y.

The plug of the present invention is broadly useful in all types of plug assist thermoforming operations. This includes those systems wherein drawing is acomplished by dual cushions of air emanating from both the plug and mold cavity repectively or wherein final forming is by means of pressurized gas emanating from the punch or by means of vacuum imposed on the mold cavity.

In thermoforming systems utilizing the plug design of the present invention, it is desirable to have the dimension of the outer periphery of the punch approach the dimensions of the cavity as closely as possible, in order that the material has a minimum distance to travel in moving from the punch surface to the cavity walls. The reduced cross section of the plug of the present invention achieves this, yet provides adequate space to maintain the secondary billow during the actual drawing operation.

It is obvious that many variations may be made in the invention set forth above without departing from the spirit and scope of the invention as hereinafter claimed.

What I claim is:

1. In an apparatus for forming a relatively deep, thin walled article from a sheet of thermoplastic material utilizing a mold having a cavity conforming to the shape of the article, a plug arranged for movement into the cavity to draw a predetermined portion of the sheet into the cavity to partially form the article and means to expand the partially formed article against the wall of the cavity into the final form of the article, the improvement which comprises inwardly tapered oppositely disposed side wall portions of the plug for minimizing the surface contact of the plug with the sheet during partial forming of the article.

2. The apparatus of claim 1 wherein the plug has a generally rectangular cross section with rounded surfaces at its corners and at the junctions of the edges of its sides.

3. Apparatus for forming a relatively deep, thin walled container from a sheet of thermoplastic material comprising:
   (a) a mold including a cavity having a periphery generally conforming to the shape of the container;
   (b) a generally rectangular plug disposed opposite to said mold, said plug comprising a bottom wall, a pair of oppositely disposed elongated sides, each side having two longitudinally extending edges and two laterally extending edges, a pair of oppositely disposed short sides extending between said oppositely disposed short sides extending between said oppositely disposed elongated sides along the longitudinally extending edges of said elongated sides, said oppositely disposed short sides having two longitudinally extending edges and two laterally extending edges, said pairs of oppositely disposed elongated and short sides extending upwardly from the periphery of said bottom wall, a top wall extending around the upper extremities of said pairs of oppositely disposed elongated and short sides, each of said oppositely disposed elongated sides tapering slightly inwardly from each of the two longitudinally extending edges of said elongated sides toward the centers of said sides;

(c) means connected to said top wall of the plug for actuating said plug to draw a predetermined area of the plastic sheet into the cavity of the mold to partially form said container, and (d) means for expanding said partially formed container against the wall of the cavity of the mold to finish form the container.

4. The apparatus of claim 3 wherein the angle of inward taper of the elongated sides of the plug conforms to the relationship $$\tan\theta = (0.25 - 2)\frac{Y}{Z}$$

where Y represents the overall length of the laterally extending edge of the cross section of the generally rectangular plug and Z represents the overall length of the longitudinally extending edge of the cross section of the generally rectangular plug.

5. The apparatus of claim 3 wherein the cavity of the mold has a generally rectangular cross section.

6. The apparatus of claim 3 wherein the means for expanding said partially formed container is a vacuum system connected to the cavity of the mold.

7. The apparatus of claim 3 including means connected to the cavity of the mold for regulating the pressure in said cavity during formation of the partially formed container.

References Cited
UNITED STATES PATENTS

| | | | |
|---|---|---|---|
| 2,590,221 | 3/1952 | Stevens | 18—19 |
| 2,983,955 | 5/1961 | Gajdoish | 18—19X |
| 3,400,111 | 9/1968 | Schwartz | 18—19 |
| 2,910,728 | 11/1959 | Rowe, Jr. | 18—19 |
| 2,917,783 | 12/1959 | Olson et al. | |
| 2,952,875 | 9/1960 | Herrick | 18—19 |
| 2,973,558 | 3/1961 | Stratton, Jr. | 264—89 |
| 3,267,521 | 8/1966 | Kostur | 18—19 |
| 3,470,281 | 9/1969 | Knowles | 18—19 |

OTHER REFERENCES

Product Engineering M–D–September 1960 (pp. 164–167), Author: R. E. Kostur.

J. SPENCER OVERHOLSER, Primary Examiner

R. L. SPICER, JR., Assistant Examiner